June 27, 1939.  C. O. JACKS  2,163,999
TRAILER HITCH
Filed Oct. 26, 1938  4 Sheets-Sheet 1

Inventor
Charles O. Jacks

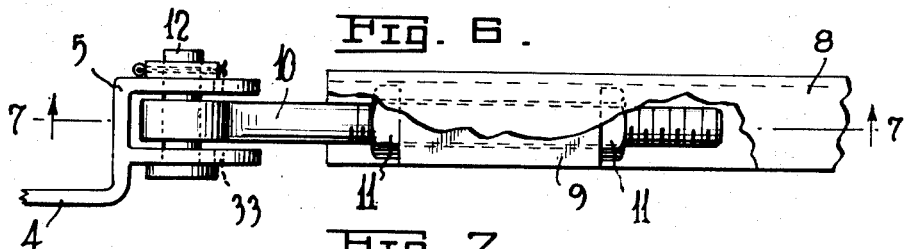
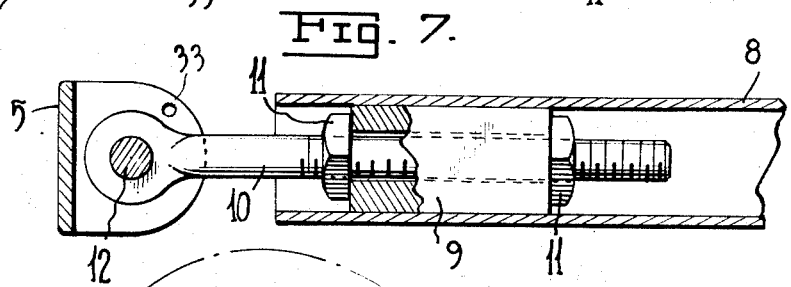
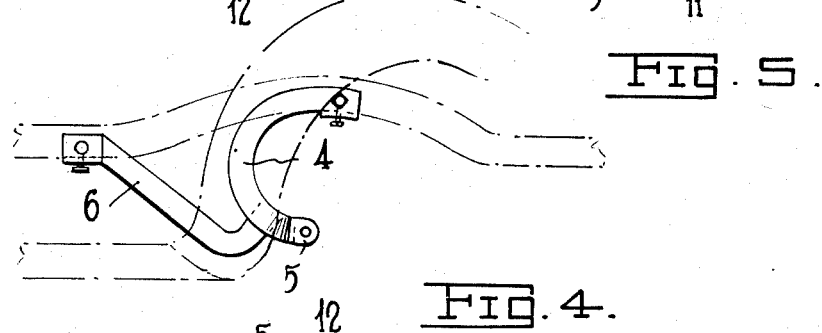
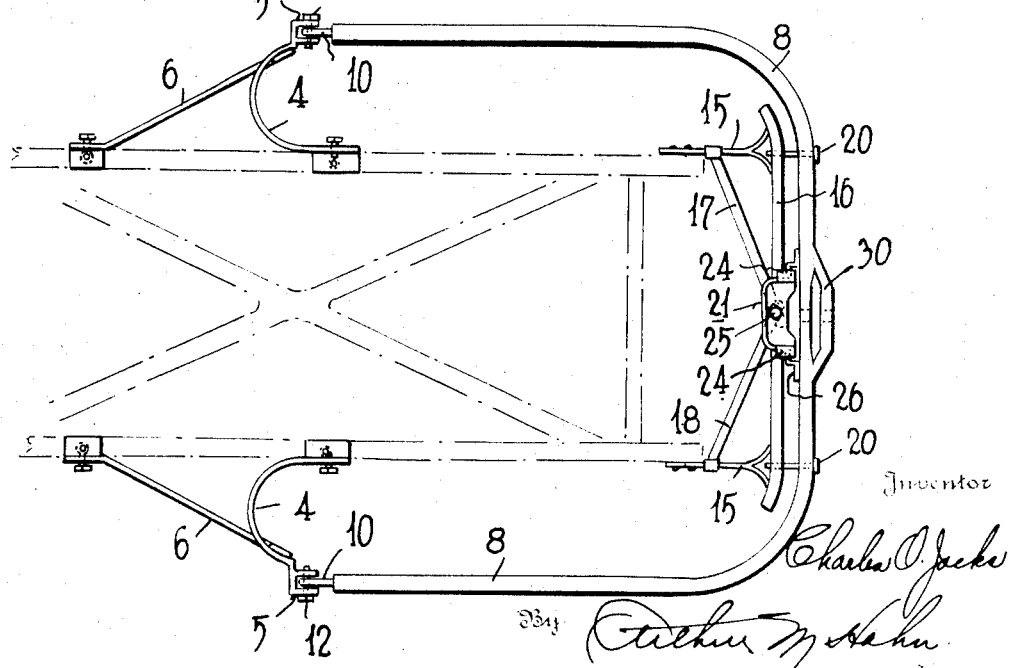

June 27, 1939.　　　C. O. JACKS　　　2,163,999
TRAILER HITCH
Filed Oct. 26, 1938　　　4 Sheets-Sheet 3
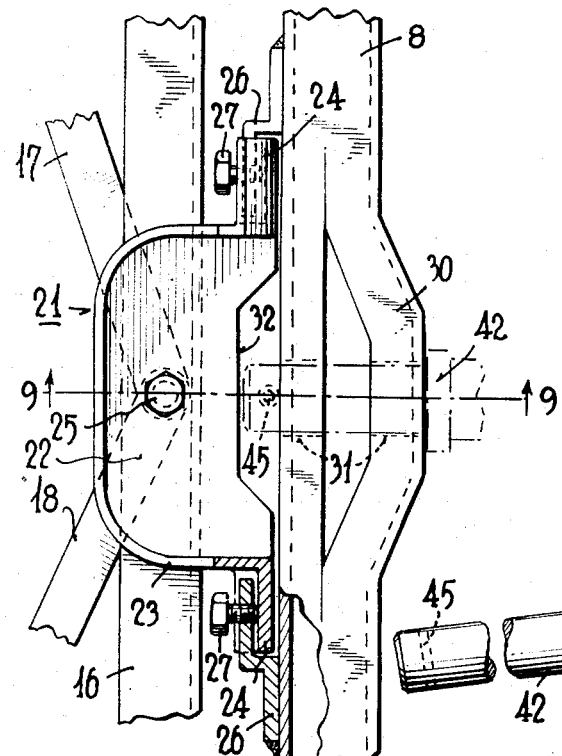
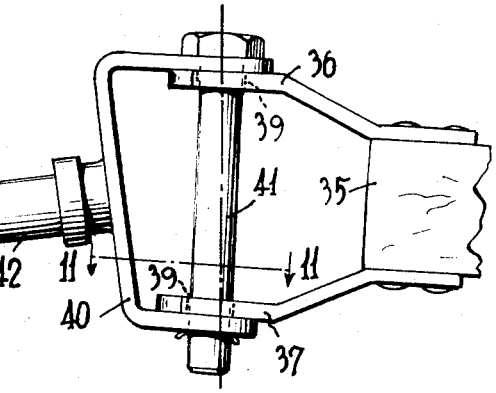
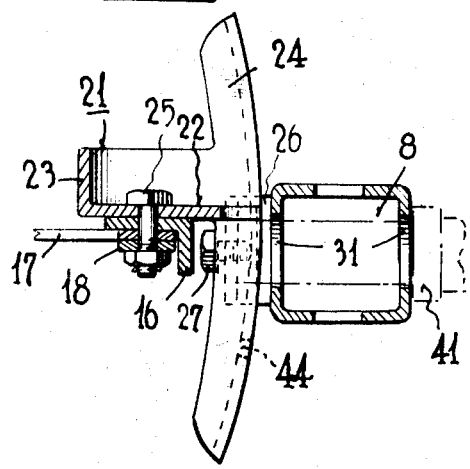
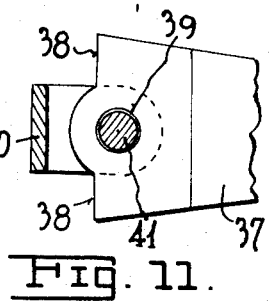
Inventor
Charles O. Jacks
By Arthur M. Hahn
Attorney June 27, 1939.  C. O. JACKS  2,163,999
TRAILER HITCH
Filed Oct. 26, 1938  4 Sheets-Sheet 4
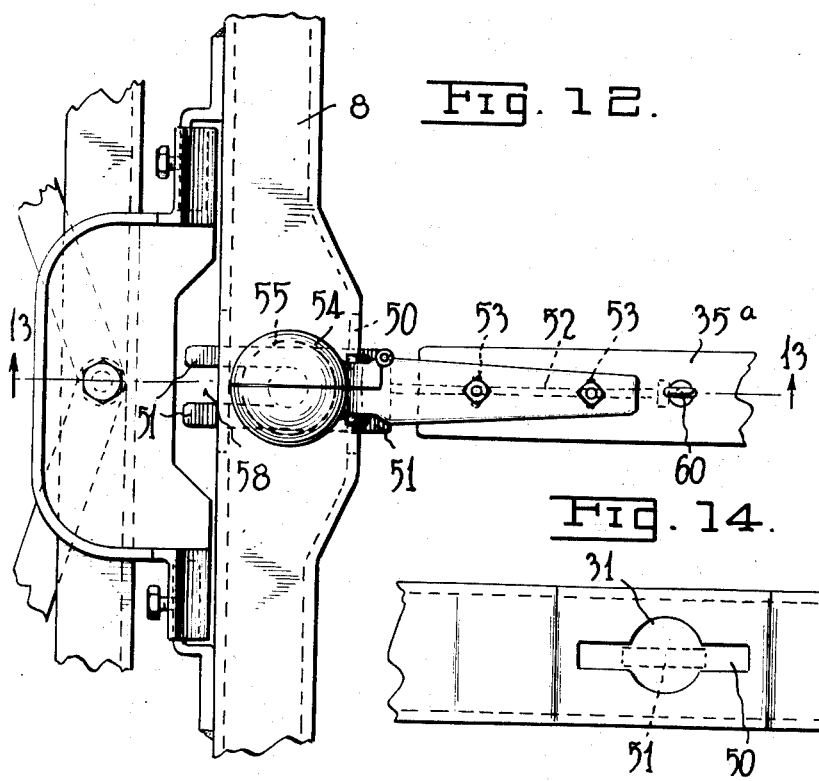
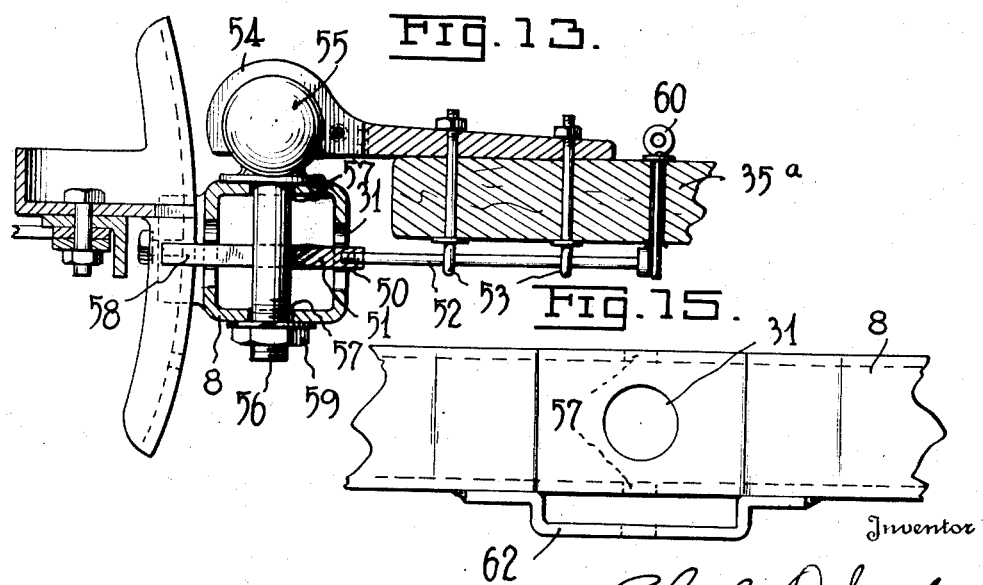
Inventor
Charles O. Jacks
By Arthur M. Hahn
Attorney Patented June 27, 1939

2,163,999

UNITED STATES PATENT OFFICE 2,163,999

TRAILER HITCH

Charles O. Jacks, Reno, Nev.

Application October 26, 1938, Serial No. 237,125

9 Claims. (Cl. 280—33.44)

This invention relates to coupling devices and has particular reference to a trailer hitch for detachably connecting a tractor such as a motor vehicle to a trailer.

It is common practice at present to connect a trailer to the tractor vehicle through a detachable connection such as a ball and socket joint, one element of which is connected to the tractor frame and the other element is connected to the trailer draw bar. This type of connection places the entire drawbar weight of the trailer on the rear of the tractor frame and hence on the tractor wheels. Where large and heavy trailers are used it is often necessary to replace the rear springs of the tractor vehicle with heavier ones to obtain the proper riding qualities in the trailer vehicle. Even when this replacement is made, the excessive weight on the rear wheels causes severe wear on the tires of the tractor vehicle. Also, when the tractor vehicle is used without the trailer, the heavier springs then affect the riding qualities thereof. When the ball and socket type of connection is used, difficulty is experienced due to universal movement, in the trailer tracking with the towing vehicle. This is particularly noticeable on turns and when the trailer is being towed from the side of the road up over a shoulder onto the road as there is a tendency for the trailer wheels to follow the raised edge of the road shoulder some distance before the wheels will mount the shoulder.

It is the primary object of the present invention to provide an improved trailer hitch which will overcome the aforementioned objections by transferring the major portion of the trailer drawbar weight to the tractor vehicle frame at a point forward of the rear wheels of the draft vehicle.

Another object is to provide a trailer hitch of such character that the trailer is free to move to the right or left or turn about a longitudinal axis, but is restrained from moving freely in a vertical plane with respect to the draft vehicle.

Another object is to provide a trailer hitch wherein the pivotal connection, permitting right and left movement of the trailer, is disposed at a slight angle with respect to the vertical, thereby imparting a strong tendency for the trailer to always follow in longitudinal alignment with the tractor, such action being similar in effect to the self-aligning of the steering wheels of a vehicle due to the camber of the wheels or slope of the king pins which pivotally support the same.

Another object is to provide a trailer hitch wherein the tractor element of the detachable connection is in the form of a U-bar that is pivotally connected on opposite sides of the tractor frame at points forward of the rear wheels thereof, and which extends entirely around the rear portion of the tractor vehicle, thereby providing a protective bumper guard for the rear portion of the tractor vehicle body.

Another object is to provide a tractor drawbar of the aforesaid character which shall include means for detachably connecting the ball and socket connection of the present standard trailer hitch thereto so that persons owning trailers with the ball and socket connection may easily connect the same with my improved tractor drawbar.

A further object is to provide a novel and improved form of trailer hitch of the aforesaid character which shall include means for relieving the stresses and strains that would normally be imposed on the pivotal connections of the U-shaped drawbar, and which shall permit the drawbar to be swung to an inoperative position so that tires or wheels may be easily changed or other work may be easily accomplished on the draft vehicle.

A still further object is to provide a trailer hitch of the aforesaid character which shall consist of relatively few parts that are simple in construction and inexpensive to manufacture, and which may be easily and quickly attached to various draft vehicles without material alterations to the vehicle or trailer.

With the foregoing and other objects in view, the invention may be stated to consist in the various novel features of construction and arrangement or combination all of which will be fully described hereinafter and pointed out in the appended claims.

In the drawings accompanying and forming a part of this application:

Figure 4 is a top plan view of that portion of the trailer hitch which is carried by the draft vehicle, and showing the draft vehicle frame in dot and dash lines;

Figure 5 is a side elevation of the attaching bracket which is carried by the draft vehicle;

Figure 6 is a top plan view with parts broken away of the adjustable connection between the attaching bracket and the U-bar of the draft vehicle;

Figure 7 is a longitudinal sectional view taken on the line 7—7 of Figure 6;

Figure 8 is a fragmentary top plan view of the rear central portion of the coupling on the draft vehicle;

Figure 9 is a vertical transverse sectional view taken on the line 9—9 of Figure 8;

Figure 10 is a side elevation of the tractor coupling element;

Figure 11 is a fragmentary horizontal sectional view taken on the line 11—11 of Figure 10;

Figure 12 is a fragmentary top plan view of a modified form of construction illustrating a standard ball and socket trailer drawbar hitch connected to my improved tractor drawbar;

Figure 13 is a vertical sectional view taken on the line 13—13 of Figure 12;

Figure 14 is a fragmentary end elevation of the tractor draw bar U-shaped member illustrated in Figure 12; and Figure 15 is a similar view illustrating a modified form of construction.

Figure 1:
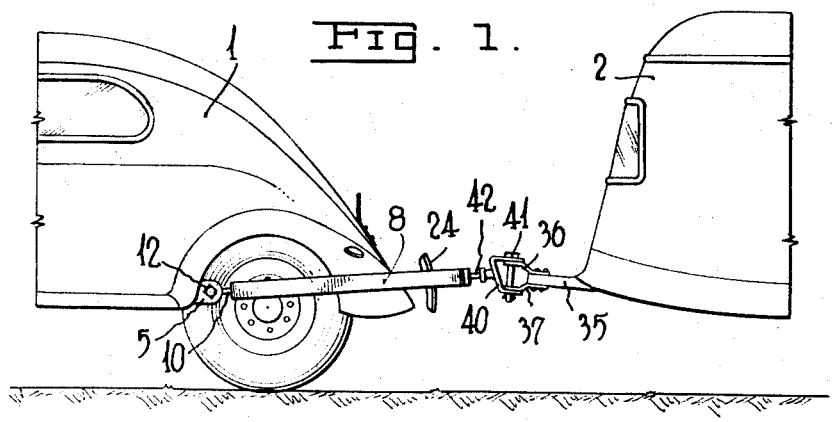
Figure 1 is a fragmentary view in side elevation showing a trailer hitch constructed in accordance with my invention. In this form, the parts are so arranged that the drawbar weight of the trailer is slightly above the centers of the draft vehicle wheels.
Figure 2:
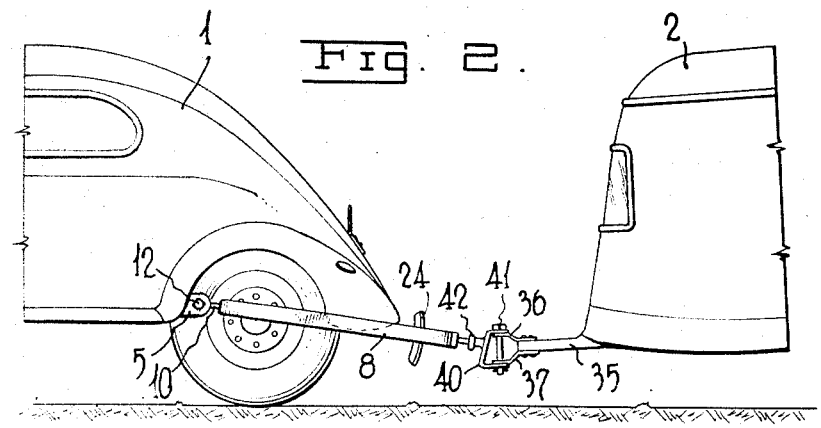
Figure 2 is a similar view but illustrating the parts so arranged that the drawbar weight of the trailer is slightly below the centers of the draft vehicle wheels.
Figure 3:
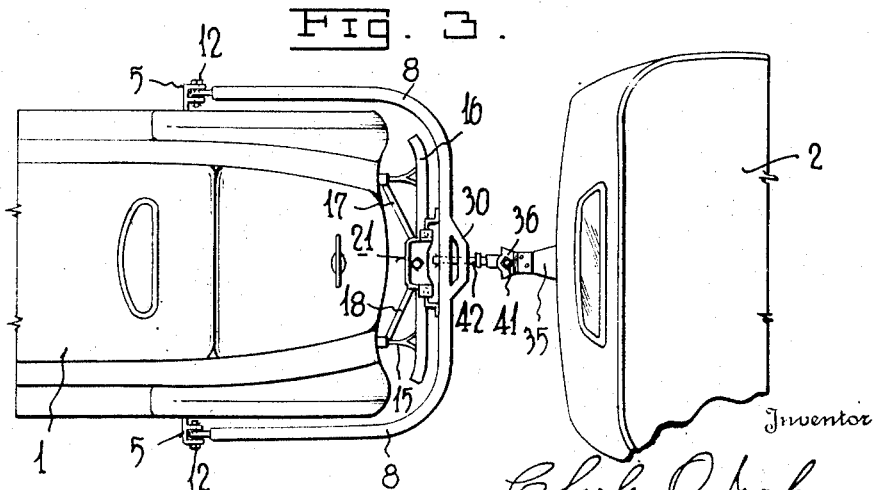
Figure 3 is a top plan view thereof.

Referring to Figures 1–3, the reference numeral 1 indicates a draft vehicle and 2 a trailer. In these views, for purpose of illustration, the draft vehicle is shown as an ordinary automobile and the trailer is of the conventional type, and the description hereinafter will refer particularly to the invention as applied thereto. It will be understood, however, that these vehicles may be of any other type as the invention resides in the coupling device per se and not in the vehicles which it connects.

When the device is applied to a draft vehicle such as an automobile, suitable attaching brackets for the U-bar are connected to the vehicle frame. These brackets are illustrated in Figures 4 and 5 and each comprises an arcuate arm 4, one end of which is fastened to the vehicle frame, while the opposite end is bifurcated at 5 to pivotally receive an end of the U-bar to be described hereinafter. Each of the arms 4 is fastened to the frame at a point forward of the vehicle rear axle and extends outwardly and downwardly, preferably following closely the curvature of the rear fender of the vehicle so as to be as inconspicuous as possible and also provide ample clearance for the rear wheels of the vehicle. In order to rigidly support the outer end 5 of each bracket, a brace 6 is connected at one end to the frame and at the other end to the bracket adjacent its outer end. Each of these braces is bent to extend from the frame, downwardly and rearwardly beneath the vehicle running board and thence to the bifurcated end portion 5 of the bracket 4 as clearly shown in Figure 5. It is thus apparent that each of the brackets is rigidly secured to the vehicle frame and at points forward of the draft vehicle rear axle.

Pivotally connected to the brackets 4 is a U-shaped draft member 8. One end of this member is pivotally connected to the bifurcated end 5 of one of the brackets, then extends rearwardly completely around the rear end of the vehicle, and then forwardly to the opposite bracket end portion 5. Each end of the U-shaped member 8 is fitted with an adjustable connection whereby the member 8 may be adjusted longitudinally with respect to the draft vehicle thus permitting attachment to various makes and types of draft vehicles. As shown in detail in Figures 6 and 7, each end of the U-shaped member 8 is fitted with a threaded sleeve 9 which is rigidly secured thereto in any approved manner, as by welding. Threaded into the sleeve is an eye bolt 10, on which are threaded suitable lock nuts 11 to hold the eye bolt in adjusted position. The outer end of each eye bolt is received in the bifurcated end 5 of its respective bracket 4 and a pivot pin 12 extends therethrough. It is apparent that by releasing the lock nuts 11, the eye bolts 10 may be rotated in threaded bushings 9 to move the entire U-shaped member forwardly or rearwardly of the draft vehicle to the desired position, after which the parts are locked in adjusted position.

In the case of an automobile, the standard rear bumper bar is disconnected from the supporting brackets that ordinarily are fastened to the rear portion of the vehicle frame. These brackets are indicated at 15 in Figure 4. If the draft vehicle is of a type not ordinarily fitted with a rear bumper, suitable brackets 15 similar to those shown in Figure 4 are then connected to the frame. The standard or ordinary bumper bar is replaced with an angle bar 16 (Figures 4 and 9) which is secured to the brackets 15 in the usual or any approved manner. This angle bar is preferably arranged with one surface horizontal and the other surface depending vertically at the rear or outer side of the bar, as clearly shown in Figures 8 and 9, for a purpose which will become apparent hereinafter. In order to strengthen the bar 16, suitable diagonally disposed braces 17 and 18 are connected to the central portion thereof and extend to the brackets 15 where they are fastened in any suitable or approved manner. These braces absorb the end thrust or pull when the vehicles are stopping or starting. When the draft vehicle is being used without the trailer, the U-shaped member 8 is held against movement about its pivots 12 by bolts 20 (Figure 4) which extend through the member 8 and are threaded into the angle bar 16. The U-shaped member 8 then forms an effective protective bumper for the rear fenders and rear of the tractor vehicle.

When the coupling is in use for towing a trailer, the bolts 20 are removed and the U-shaped member is then free to swing on pivot pins 12 with certain restrictions to be described. Mounted on angle bar 16 is a cup shaped member 21 having a bottom wall 22, side wall 23 and arcuate end straps 24. This member is conveniently fastened to the angle bar 16 by a bolt 25 which also serves to fasten the diagonal braces 17 and 18. The arcuate straps 24 extend vertically above and below the angle bar 16 and these straps are engaged in guides formed by Z-shaped brackets 26 which are welded or otherwise fastened to the member 8 as clearly shown in Figure 8. A bolt 27 threaded through each bracket 26, frictionally engages the arcuate strap and thus offers a resistance to the free movement of U-member 8 about its pivot pins 12. This resistance may be varied by adjusting the bolts 27 to increase or decrease the pressure thereof on the arcuate straps 24. In effect, this structure provides a variable brake for the U-shaped bar.

The U-shaped member 8 is formed with an offset and rearwardly extending portion 30 at the rear central portion thereof and an aperture 31 extends through this portion 30 and also the member 8, to provide a seat for the trailer coupling spindle to be described hereinafter. It will also be noted, as clearly shown in Figure 8, that the rear edge of the bottom wall 22 is recessed at 32 to provide clearance for the trailer coupling spindle when seated in apertures 31.

From the foregoing description, it will be apparent that the tractor vehicle is provided with a U-shaped member 8 that forms an effective bumper when the bolts 20 are screwed into position to hold the member stationary. If it becomes necessary to change a tire or wheel or perform other work on the rear of the tractor vehicle, the bolts 20 may be readily removed and the U-shaped member 8 may be swung upwardly about pivot pins 12 to provide ample clearance. In this connection, it will be noted that the bifurcated ends 5 of the supporting brackets 4 are provided with apertures 33 as shown in Figures 6 and 7. When the member 8 is swung upwardly, suitable pins or rods, not shown, may be inserted through the apertures 33 beneath the shanks of the eye bolts 10 to hold the U-shaped member 8 in elevated position.

The trailer coupling element is illustrated in detail in Figures 10 and 11. This portion of the coupling is designed to be fastened to the usual drawbar 35 of the trailer, and comprises a pair of vertically spaced arms 36 and 37, each of which, at the outer end is widened and formed with stop shoulders 38 adjacent an aperture 39. A vertically disposed U-shaped element 40 having similar apertures is pivotally connected to the arms 36 and 37 by a king bolt 41. It will be noted that the vertical portion of element 40 is not parallel to king bolt 40 and further that the width of this element is less than the width of the end portion of arms 36 and 37. In this manner, the element 40 will engage the stop shoulders 38 to limit the rotary movement thereof about king pin 41. A coupling spindle 42 is welded or otherwise secured to element 40 and this spindle is arranged at an obtuse angle with respect to king pin 41.

In use, assuming it is desired to couple a trailer to the tractor vehicle, the operator first removes bolts 20 to free the U-shaped member 8. In order to prevent this member from dropping down on the ground, a pin, not shown, may be inserted in an aperture 44 in one of the arcuate straps 24 (Figure 9), whereupon the member 8 may temporarily rest on this pin. The trailer front end is then jacked up in the usual manner so that the coupling spindle 42 will be in alignment with the apertures 31 in member 8. The tractor vehicle is next backed up to engage the spindle in the apertures, after which, the pin may be removed from aperture 44 and engaged through a vertically disposed aperture 45 in the end of spindle 42 to act as a safety latch. The trailer is now lowered, placing the drawbar weight thereof on the spindle 42. This weight will provide ample friction to prevent withdrawal of the spindle from the apertures 31 due to the angularity of the coupling as shown in Figures 1 and 2, however, the pin in aperture 45 provides an additional safety measure.

As shown in Figure 1, the parts are so arranged that the drawbar weight will be positioned above the transverse center of the rear wheels of the tractor. If it is desired to increase the traction on the rear wheels, the trailer coupling need only be turned through 180° on the trailer drawbar 35, whereupon the drawbar weight will be positioned below the center of the rear wheels as illustrated in Figure 2.

In either type of coupling, it will be noted that the trailer is free to rotate with respect to the tractor vehicle, about a horizontal axis, or rather the longitudinal axis of the spindle 42 to accommodate the usual unevenness of the road. The trailer is also free to turn within fixed limits with respect to the tractor vehicle, about a vertical axis, or rather the axis of king bolt 41. Due to the angularity of the longitudinal axis of spindle 42 with respect to the true horizontal axis, the trailer tends to remain in the same plane as the tractor. If the trailer should rotate with respect to the tractor, this angularity of the spindle 42 will tend to return the trailer instantly to the plane of the tractor. Similarly, the angular disposition of king bolt 41 with respect to the true vertical axis, tends to keep the trailer in longitudinal alignment with the tractor. When a turn to the right or left is made, by the towing vehicle, the trailer will track therewith. This arrangement also effectively prevents weaving of the trailer which is particularly apt to occur at high speeds. Also by reason of the angularity of the king bolt 41, there is no temporary "swing out" to the front of the trailer in making turns such as is encountered when the coupling is in the form of a ball and socket joint. This "swing out" is of importance on narrow roads when another vehicle is encountered and it is necessary to pull over to the side, as the effect is to throw the forward end of the trailer toward the passing vehicle, when the tractor is pulled away therefrom.

By attaching the U-shaped member 8 to the tractor vehicle forward of the rear axle, the various forces encountered from the trailer are more evenly distributed on the tractor vehicle, thus relieving the tractor rear wheels and tires of considerable wear. In order to relieve the brackets 4 of the entire end thrusts from the trailer, it will be noted that part of this thrust is transmitted through member 8 and arcuate straps 24 to the angle bar 16 on the rear of the vehicle. The function of the bolts 27 engaging these arcuate straps is to dampen any tendency toward oscillation of the U-shaped member 8 while towing the trailer, and also to transmit part of the end thrusts to the angle bar 16. The arcuate straps 24 and their associated guide parts also act as a safety connection between the tractor and trailer should the brackets 4 fail for any reason.

A trailer coupling constructed in accordance with my invention permits the trailer to be built lower to the ground, thus lowering the center of gravity thereof and eliminating the usual step now necessary to enter the trailer. With present types of couplings, the trailer floor is between 18 and 20 inches above the ground. With my improved coupling, the trailer floor can be lowered to 13 inches off the ground and without the necessity of sloping the rear end thereof back of the trailer wheels to prevent the trailer from dragging in and out of abrupt dips or gutters.

Also with my improved coupling, the tractor vehicle can follow the road surface independently of the trailer. Furthermore, the drawbar weight of the trailer on the U-shaped member 8 is distributed more evenly on the tractor frame and all four wheels, thereby eliminating the tendency to overload the rear springs.

While it is desirable to use my trailer hitch consisting of the tractor drawbar and trailer drawbar constructed substantially as described above, the tractor drawbar can be used with trailers having the present standard ball and socket type of connection. This will enable owners of trailers having the ball and socket connection to purchase only the tractor drawbar portion of the hitch.

This modified form of construction is illustrated in Figures 12-15 inclusive. As shown in Figures 12-14 inclusive, I provide the U-shaped member 8 with a horizontally disposed slot 50 which is preferably coaxial with the aperture 31. A flat metal tongue 51 of a width less than the horizontal width of slot 50 is adapted to slide longitudinally into said slot. This tongue is formed with a longitudinal slot 58 and with a rearward extension 52 (Figure 13) that is preferably round in cross-section and which is adapted to slide longitudinally in suitable guides 53 carried by the bottom face of the trailer drawbar 35ᵃ. The usual female socket connection 54 is fastened to the top face of the trailer drawbar and projects beyond the end thereof. The usual ball portion 55 of the hitch having a threaded stud 56 is secured to the member 8 in any suitable manner, as by welding thereto, or by inserting the stud 56 through vertically aligned apertures 57 in the member 8 and securing it in position by the usual lockwasher and nut 59.

When using this type of connection, the tractor and trailer vehicles are moved into coupling position and the socket connection 54 is secured to the ball 55 in the usual manner. The rod 52 is then pushed forwardly to engage the side walls of the slot 58 with the stud 56 as shown in Figure 13. A pin 60 may be inserted through the trailer drawbar 35ᵃ into abutting relation to the end of rod 52 to limit longitudinal movement of the rod and tongue 51 when coupled to the tractor drawbar.

In Figure 15, I have illustrated a modified form of slot for receiving the tongue 51. In this form of my invention, a U-shaped bracket 62 is welded or otherwise attached to the underside of the U-shaped member 8, thus defining a slot for the reception of the tongue 51. The ball and stud thereon are mounted as in Figure 12, except that the nut 59 will engage the bracket 62 instead of the member 8 when fastened into position.

In either of the above forms of my invention, the tongue 51 will engage the end walls of slot 50 or bracket 62 to limit the right or left hand swing of the trailer.

What I claim is:

1. In a hitch of the character described for connecting a tractor vehicle and a trailer having a drawbar, a U-shaped member adapted to be pivotally connected to said tractor vehicle on opposite sides thereof at points forwardly of the rear axle, said U-shaped member extending along each side and across the rear of the vehicle, a member extending transversely of the vehicle and rigidly connected to the rear end portion thereof, the transverse member and said U-shaped member having interengaging means in the form of arcuate straps on one member and guides therefor on the other member, and means for detachably connecting said trailer drawbar to said U-shaped member.

2. In a hitch of the character described for connecting a tractor vehicle and a trailer having a drawbar, a U-shaped member adapted to be pivoted on a horizontal axis to said tractor vehicle on opposite sides thereof at points forwardly of the rear axle, said U-shaped member extending along each side and transversely of the rear of the vehicle, said U-shaped member having a longitudinally disposed socket in the transverse portion thereof, and a spindle disposed at an angle to the trailer drawbar and pivotally connected thereto and adapted to seat in said socket, said drawbar and U-shaped member being out of horizontal alignment when connected.

3. In a hitch of the character described for connecting a tractor vehicle and a trailer having a drawbar, a connecting spindle adapted to be pivotally mounted on said drawbar, the pivotal axis of said spindle being disposed at an obtuse angle with respect to the longitudinal axis of said drawbar, and a U-shaped member pivotally connected to said tractor vehicle on a horizontal axis on opposite sides of the vehicle at points forward of the rear axle, said U-shaped member having a longitudinally disposed socket adapted to receive said spindle.

4. In a hitch of the character described for connecting a tractor vehicle and a trailer having a drawbar, a connecting spindle adapted to be pivotally mounted on said drawbar, the pivotal axis of said spindle being disposed at an obtuse angle with respect to the longitudinal axis of said drawbar, a U-shaped member pivotally connected to said tractor vehicle on a horizontal axis on opposite sides of the vehicle at points forward of the rear axle, said U-shaped member having a socket adapted to receive said spindle, and means including a vertical guide connecting the portion of the tractor vehicle rearwardly of the rear axle with said U-shaped member, said means permitting movement of said U-shaped member about its pivotal axis.

5. A draft attachment for a tractor vehicle including a bar disposed transversely of and secured to the rear of the vehicle, a U-shaped member having a transverse portion adjacent said bar and forwardly extending arms rigid with respect to said transverse portion, said arms each being pivotally connected to the vehicle at points forwardly of the rear axle, interengaging means including braking means on said bar and the transverse portion of said U-shaped member serving to resist the movement of said U-shaped member about its pivots, and means for detachably connecting a trailer drawbar to the transverse portion of said U-shaped member.

6. A draft attachment for a trailer drawbar comprising a pair of vertically spaced arms adapted to be connected to the drawbar and project forwardly therefrom, a U-shaped member pivotally connected to said arms on a vertically disposed axis, and a connecting spindle carried by said U-shaped member, the pivotal axis of said U-shaped member being disposed at an obtuse angle with respect to the longitudinal axis of said spindle.

7. A draft attachment for a trailer draw bar comprising a pair of vertically spaced arms adapted to be connected to the drawbar and project forwardly therefrom, a U-shaped member pivotally connected to said arms on a vertically disposed axis, a connecting spindle carried by said U-shaped member, the pivotal axis of said U-shaped member being disposed at an obtuse angle with respect to the longitudinal axis of said spindle, and means for limiting the pivotal movement of said U-shaped member with respect to said arms.

8. In a hitch of the character described for connecting a tractor vehicle and a trailer having a drawbar, a connecting spindle adapted to be pivotally mounted on said drawbar, the pivotal axis of said spindle being disposed at an obtuse angle with respect to the longitudinal axis of said drawbar, a U-shaped member pivotally connected to said tractor vehicle on a horizontal axis on opposite sides of the vehicle at points forward of the rear axle, said U-shaped member having a longitudinally disposed socket adapted to receive said spindle, and means for locking said U-shaped member to the tractor vehicle against pivotal movement.

9. In a hitch of the character described for connecting a tractor vehicle and a trailer having a drawbar, a connecting spindle adapted to be pivotally mounted on said drawbar, the pivotal axis of said spindle being disposed at an obtuse angle with respect to the longitudinal axis of said drawbar, a U-shaped member pivotally connected to said tractor vehicle on a horizontal axis on opposite sides of the vehicle at points forward of the rear axle, said U-shaped member having a socket adapted to receive said spindle, means including a vertical guide connecting the portion of the tractor vehicle rearwardly of the rear axle with said U-shaped member, said means permitting movement of said U-shaped member about its pivotal axis, and means for locking said U-shaped member to the vehicle against pivotal movement when the trailer draw bar is disconnected from a trailer.

CHARLES O. JACKS.